G. D. JONES.
OUTLET VALVE FOR IRRIGATING DEVICES.
APPLICATION FILED MAR. 4, 1912.
1,112,622.
Patented Oct. 6, 1914.
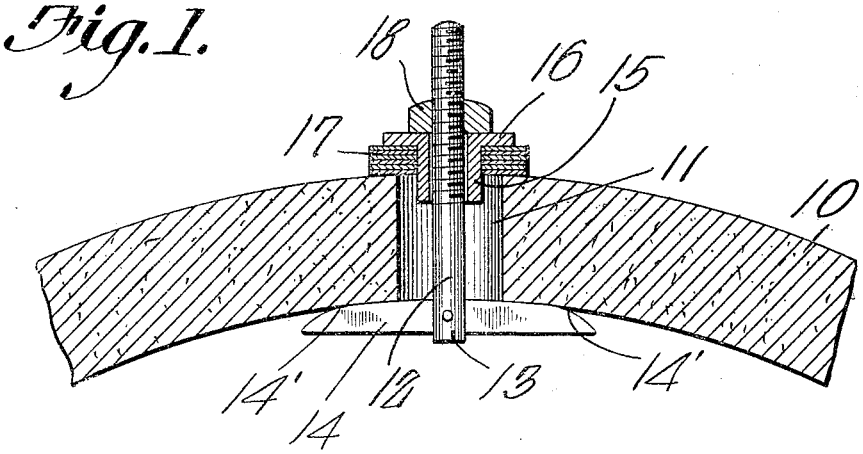
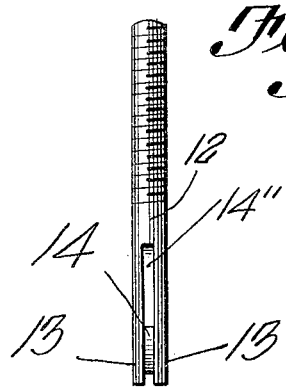
Witnesses
George D. Jones, Inventor
by C. A. Snow & Co., Attorneys

UNITED STATES PATENT OFFICE.

GEORGE D. JONES, OF KOKOMO, INDIANA.

OUTLET-VALVE FOR IRRIGATING DEVICES.

1,112,622.  Specification of Letters Patent.  Patented Oct. 6, 1914.

Application filed March 4, 1912. Serial No. 681,502.

*To all whom it may concern:*

Be it known that I, GEORGE D. JONES, a citizen of the United States, residing at Kokomo, in the county of Howard and State of Indiana, have invented a new and useful Outlet-Valve for Irrigating Devices, of which the following is a specification.

This invention relates to an improvement in outlet valves for irrigating pipes.

The primary object of the present invention is to provide an outlet which will allow for a free distribution of water and which will at the same time be of a construction that will prevent foreign matter from entering the outlet and obstructing the flow of water.

A further object of the invention is to provide means whereby the closure for the opening in the distributing pipe may be conveniently adjusted.

A still further object of the invention is to provide a structure which may be readily positioned within the outlet opening of the distributing pipe.

In the drawings Figure 1 is a sectional view. Fig. 2 is a detail view of the sleeve. Fig. 3 is a detail view of the screw threaded anchoring bolt.

In the drawings, 10 designates the irrigating pipe which is provided with an outlet 11. These pipes are disposed beneath the ground and it has heretofore been the practice to provide the same with valve structures made of cork, rubber or the like, which structures corrode, decay and are rendered inoperative, by foreign matter which follows the flow of water. This foreign matter obstructing the outlets of such valve structures renders the egress of water impossible.

The present invention contemplates a non-corrodible closure which will permit the egress of the water and yet prevent foreign matter from clogging the opening 11. In carrying out this idea the screw threaded anchoring bolt or support 12 is provided, said bolt being formed with the bifurcated terminal 13 between the bifurcations of which is pivotally supported an anchor 14. Arranged on said bolt 12 is a sleeve 15 (shown in detail in Fig. 2), said sleeve being provided with an annular flange 16 of a diameter in excess of the diameter of the opening 11. Prior to placing the sleeve 15 upon the anchoring bolt 12 a plurality of mica disks 17 are assembled on the sleeve, the sleeve being forced within the opening 11, the disks contacting with the portion of the pipe surrounding said opening. In order to hold the disks in contact with the pipe, the bolt 12 receives a nut 18 which may be rotated to increase or diminish the contact of the disks with the pipe, the tightening of the nut 18 forcing the pivoted anchor 14 into engagement with the inner wall of the pipe, the end portions 14' of the anchor being rounded at the point where the same contacts with said pipe. The water will flow through the opening 11 beneath the lowermost of the disks, said disk while being held in contact with the pipe permitting the water to flow freely.

It will be noted that the disks may be of any desired number, the same being readily removed and replaced. It will also be noted that said disks being of mica will not corrode, the disks at all times permitting the free exit of the water. Attention is also called to the fact that the disks are held in such contact with the pipe as to exclude foreign matter.

What is claimed is:—

In a sub-soil irrigating device, a pipe having an opening; a plurality of superposed mica disks disposed on the exterior of the pipe about the opening; a support passing through the disks; an anchor on the support and engaging the interior of the pipe; adjusting means on the support and located outside of the pipe; and a sleeve surrounding the support and passing through the disks, the sleeve having a lateral flange of greater diameter than the opening and engageable by the adjusting means and one disk, the sleeve serving at once to protect the disks against contact with the support and to prevent relative lateral movement and mutual wearing friction between the disks.

In testimony that I claim the foregoing as my own, I have hereto affixed my signature in the presence of two witnesses.

GEORGE D. JONES.

Witnesses:
 SELINA WILLSON,
 ANNA C. BURKE.